United States Patent [19]

Beale

[11] 4,135,581

[45] Jan. 23, 1979

[54] WEEDING ROD UNIT FOR PLOWS

[76] Inventor: Elden C. Beale, 2445 W. Elm St., Lodi, Calif. 95240

[21] Appl. No.: 831,985

[22] Filed: Sep. 9, 1977

[51] Int. Cl.² ............................................. A01B 39/18
[52] U.S. Cl. .................................... 172/142; 172/193
[58] Field of Search ............... 172/707, 155, 44, 515, 172/516, 708, 96, 763, 192–195, 142; 56/400

[56] References Cited

U.S. PATENT DOCUMENTS

| 2,178,469 | 10/1939 | Burke | 172/193 |
|---|---|---|---|
| 2,190,166 | 2/1940 | Simmons | 172/193 X |
| 2,307,533 | 1/1943 | Neumann | 172/194 X |
| 2,715,865 | 8/1955 | Dennewitz | 172/194 |
| 2,793,579 | 5/1957 | Doskocil | 172/193 |
| 3,186,494 | 6/1965 | Jackson | 172/629 X |
| 3,770,066 | 11/1973 | Young | 172/194 |

Primary Examiner—Richard J. Johnson
Attorney, Agent, or Firm—Roger B. Webster

[57] ABSTRACT

A weeding rod unit arranged in combination with a plow which embodies a plowshare and a shank upstanding from the plowshare for attachment to a tractor-drawn tool bar; the weeding rod unit comprising an arm secured to and projecting rearwardly from the shank adjacent but above the plowshare, individual spring rods projecting laterally and oppositely outwardly from the arm in a plane to run in weeding relation at or slightly below ground level when the plowshare is at working depth, and said oppositely projecting rods being integral with and emanating from a vertical-axis spring coil fixedly secured to said arm.

1 Claim, 4 Drawing Figures

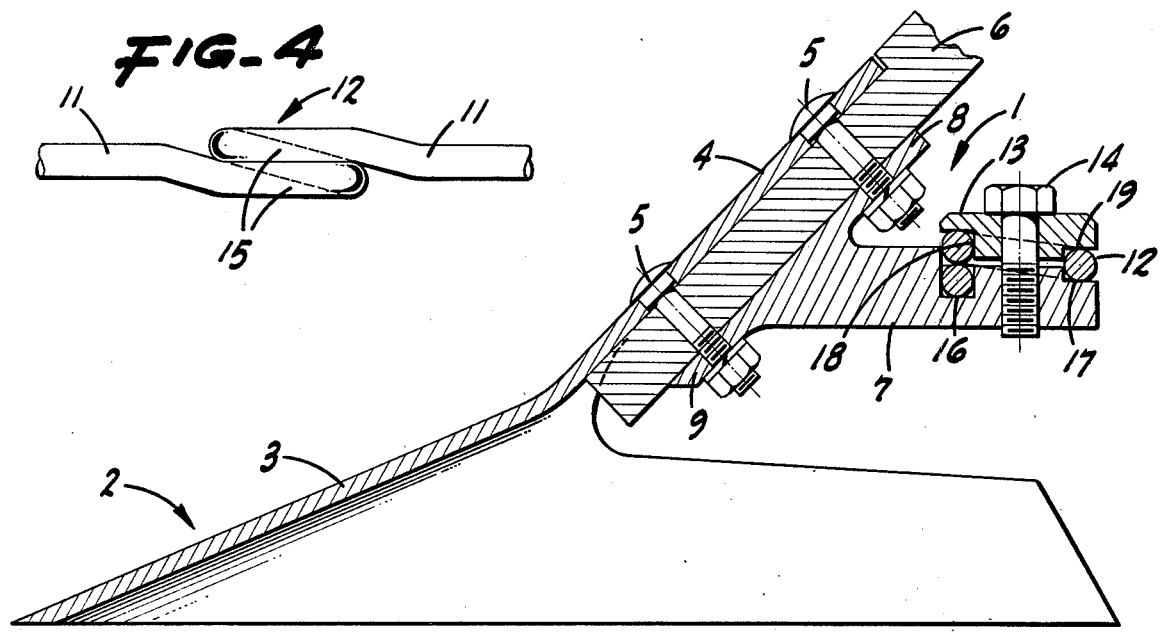
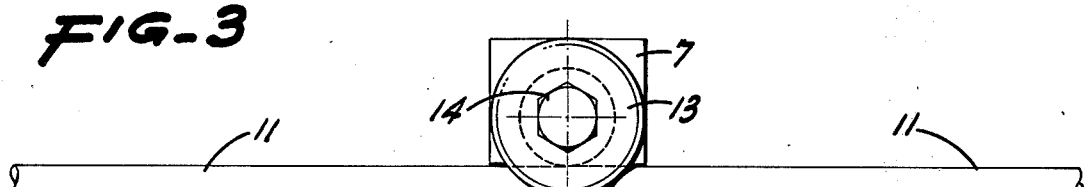
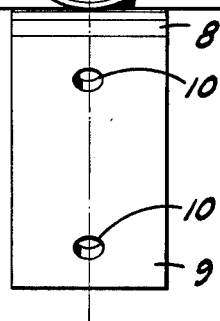

WEEDING ROD UNIT FOR PLOWS

BACKGROUND OF THE INVENTION

1. Field of the Invention

In agricultural cultivation of row crops, plows are frequently employed in multiples and set with a predetermined row spacing therebetween; the result being—unless some weeding accessory or attachment is provided—that weeds growing in the spaces between the rows are untouched by the plow. The present invention was conceived in a successful effort to provide such an attachment—in an improved form—for a plow.

2. The Prior Art

U.S. Pat. Nos. 2,483,204; 2,715,865; 2,772,618; 2,805,613; 3,186,494; 3,211,237; 3,542,134 and 3,633,678 represent the most relevant prior art known to applicant.

The above prior art—considered singly or together—does not anticipate, nor suggest as obvious, the particular structure of the herein-claimed weeding rod unit for plows, and applicant has no knowledge of any prior art disclosing such particular structure.

SUMMARY OF THE INVENTION

The present invention provides, as an important object, a novel weeding rod unit adapted for use in combination with a plow which embodies a plowshare and a shank upstanding from the plowshare for attachment to a tractor-drawn tool bar; the weeding rod unit comprising an arm secured to and projecting rearwardly from the shank adjacent but above the plowshare, individual spring rods projecting laterally and oppositely outwardly from the arm in a plane to run in weeding relation at or slightly below ground level when the plowshare is at working depth, and said oppositely projecting rods being integral with and emanating from a vertical-axis spring coil fixedly secured to said arm.

The present invention provides, as another important object, a weeding rod unit which is arranged for ready attachment to the shank which upstands from the plowshare, and—when so attached—can withstand long usage without damage—other than the normal wear and tear to which ground-working implements are subject.

The present invention provides, as a further object, a weeding rod unit which—in addition to its weeding functions —also tends to level and smooth the ground which the rods traverse.

The present invention provides, as a further object, a weeding rod unit which is designed for ease and economy of manufacture.

The present invention provides, as a still further object, a practical and reliable weeding rod unit, and one which is exceedingly effective for the purpose for which it is designed.

BRIEF DESCRIPTION OF THE DRAWINGS

FIG. 1 is a plan view showing two of the weeding rod units on corresponding and adjacent plows.

FIG. 2 is an enlarged plan view of one weeding rod unit, detached and with opposite end portions of the rods broken away.

FIG. 13 is an enlarged sectional elevation of one weeding rod unit as mounted on a plow for use; the view being taken substantially on line 3—3 of FIG. 1.

FIG. 4 is an enlarged elevation of the spring coil, with the rods being mainly broken away.

DESCRIPTION OF THE PREFERRED EMBODIMENT

Referring now more particularly to the drawings and to the characters of reference marked thereon, the weeding rod unit, indicated generally at 1, is adapted for use on an agricultural plow, indicated generally at 2.

The plow 2 includes a plowshare 3 having an upstanding neck 4 secured by vertically spaced nut-retained bolts 5 to the lower end portion of a shank 6 adapted to be attached to and depend from a tractor-drawn tool bar (not shown).

Such plows are frequently employed in multiples and are set with a predetermined row-spacing therebetween, and hence weeds growing in such spaces are not touched by the plow. The present invention provides an attachment whereby—with advance of the plows—the weeds in such row spaces on each side of the plow are effectively eradicated.

The weeding rod unit of the present invention comprises a substantially horizontal, short-length arm 7 which is relatively wide; such arm being affixed to and projecting rearwardly from the lower portion of the shank 6. More particularly, the arm 7 is configured at its forward end to matchingly engage the back side of shank 6; the arm including an upper attachment flange 8 and a lower attachment flange 9 provided with bolt holes 10 for the reception of the corresponding nut-retained bolts 5. Such bolts thus not only serve to secure the plowshare neck 4, but also the arm attachment flanges 8 and 9, to said lower portion of the shank 6.

Individual spring rods 11 project laterally and oppositely outwardly from the arm 7 rearwardly of the shank 6; such rods 11 being integral at their inner ends with a central, vertical-axis spring coil, indicated generally at 12.

The spring coil 12 symmetrically overlies the rear portion of the arm 7 and is clamped thereto by top washer 13 held in clamping relation to the coil by a center bolt 14. The turns 15 of coil 12 are bound in circumferential notches 16 and 17 in the arm and corresponding notches 18 and 19 in the washer.

With the foregoing arrangement, the coil 12 is effectively and positively clamped on the arm 7 with the spring rods 11 projecting laterally outwardly at substantially a right angle to the direction of travel of the plow.

With each weeding rod unit 1 constructed as described, and mounted on a plow 2, the laterally and oppositely projecting spring rods 11 occupy a position such that when the plowshare 3 is at working depth, such rods 11 run in weeding relation at or slightly below ground level which eliminates the weeds in the paths along which the rods travel. Additionally, the rods produce a certain leveling and smoothing of the ground along such paths.

Also, it is to be recognized that—because of the spring nature of the rods 11 and the included integral spring coil 12—such rods (if they encounter an obstruction) will, without damage to the weeding rod unit, bend back and then spring forward to normal position after the obstruction is passed.

The rod 11 are dimensioned, in length, such that when weeding rod units 1 are mounted on adjacent plows 2, those rods, of the units, which project toward each other terminate in closely adjacent end-to-end relation. See FIG. 1.

From the foregoing description, it will be readily seen that there has been produced such a weeding rod unit as substantially fulfills the objects of the invention, as set forth herein.

While this specification sets forth in detail the present and preferred construction of the weeding rod unit, still in practice such deviations from such detail may be resorted to as do not form a departure from the spirit of the invention as defined by the appended claims.

I claim:

1. A weeding rod unit for use in connection with a plow which includes a plowshare secured to an upstanding shank adapted for attachment to a tractor-drawn tool bar; the weeding rod unit comprising a rigid arm adapted to project rearwardly from the shank adjacent but above the plowshare, means in part integral with the forward end of the arm to mount the latter at said end on the shank, individual spring rods projecting in alinement laterally and oppositely outwardly from the arm in a plane to run in weeding relation on or slightly below ground level when the plowshare is at working depth, the rods being included in a continuous rod length a central portion of which is wound as a vertical-axis spring coil, the vertical-axis spring coil symmetrically overlying the rear of the arm and resting thereon, and means securing the vertical-axis spring coil on the arm; said securing means being a washer engaging the vertical-axis spring coil from above, and a bolt extending centrally through the washer and coil clamping the latter to said arm; the upper face of the arm being of a lateral width at least equal to the outside diameter of the vertical-axis spring coil, the washer being of a diameter at least equal to said outside diameter of such vertical-axis spring coil, and adjacent faces of the washer and arm being circumferentially notched for matching reception of the coil and in which notches said coil is bound.

* * * * *